United States Patent [19]

Sourgens et al.

[11] 4,024,357
[45] May 17, 1977

[54] CENTERING DEVICE FOR A TRANSVERSE FILTER OF AN ECHO CANCELLER

[75] Inventors: Jacques Sourgens, Massy; Dominique Lajotte, Ris Orangis; Francois Michelon, Bretigny-sur-Orge, all of France

[73] Assignee: Compagnie Industrielle des Telecommunications Cit-Alcatel, Paris, France

[22] Filed: June 27, 1975

[21] Appl. No.: 591,078

[30] Foreign Application Priority Data

July 3, 1974 France .............................. 74.23133

[52] U.S. Cl. ............................................ 179/170.2
[51] Int. Cl.² .......................................... H04B 3/20
[58] Field of Search .......... 179/170.2, 170.6, 170.8

[56] References Cited

UNITED STATES PATENTS

| 3,721,777 | 3/1973 | Thomas | 179/170.2 |
| 3,732,410 | 5/1973 | MacKechnie | 179/170.2 |
| 3,735,055 | 5/1973 | Thomas | 179/170.2 |
| 3,922,505 | 11/1975 | Höge | 179/170.2 |

Primary Examiner—William C. Cooper
Assistant Examiner—Randall P. Myers

[57] ABSTRACT

Centering device for an adjustable transverse filter of a digital echo canceller in a telephone network, in which said transverse filter produces samples of a synthetic echo signal $\hat{y}(t)$ deduced from N servo-controlled weights C representing the samples of the pulse-response of the echo path and deduced from the same number of samples X (T) of a signal $x(t)$ in the reception line, and in which the N samples X (T) are delayed in a delay circuit ahead of said transverse filter, the delay time being given by the minor rank of said coefficients C lying above a threshold value, this minor rank being detected at the end of given convergence time of said transverse filter.

3 Claims, 4 Drawing Figures

CENTERING DEVICE FOR A TRANSVERSE FILTER OF AN ECHO CANCELLER

The present invention relates to echo canceller operating by means of a transverse filter having a servo-controlled weighting coefficient in the signal-transmitting circuits, particularly in telephone networks.

As is known, a telephone network connecting two subscribers comprises for each subscriber, a bidirectional two-wire circuit; each two-wire circuit being adapted to be connected to a four-wire circuit by means of a hybrid coil. FIG. 1 shows the layout of a telephone network of this kind connecting two subscribers A and B. In the drawing, 10 and 11 are the two-wire circuits connected to the apparatus of the respective subscribers A and B, 12 and 13 are the hybrid coils connecting these two-wire circuits 10 and 11 to the four-wire circuit formed by two channels 14 and 15 which function as a transmission line and a receiving line for each subscriber, as is indicated by the letters E and R. When subscriber A, assumed to be the distant subscriber, speaks, the hybrid coil 12 routes the transmitted signal $x(t)$ over the channel 14; the signal $x(t)$ is received by subscriber B by means of the hybrid coil 13 which routes it over the line 11.

This transmitted signal $x(t)$, received by the home subscriber B, gives rise in the channel 15, or transmission channel E of the four-wire circuit for subscriber B, to a signal returning to A; the so-called echo signal $y(t)$ making its appearance on the channel 15. The echo signal arises from the fact that the hybrid coil can never function perfectly as a separation device. This echo signal $y(t)$ returns to subscriber A after some delay and can degrade the speech quality over the telephone circuit.

Telephone networks are therefore fitted with devices for suppressing or attenuating such echo signals appearing in the transmission line of a subscriber and generated from the signal received from the distant subscriber.

Such devices are known, particularly those termed echo cancellers, which generate a synthetic echo signal $\hat{y}(t)$, which is as similar in value as possible to the echo signal $y(t)$ and is subtracted from the echo signal $y(t)$ so as to cancel it. Referring to FIG. 1, two echo-canceller devices 16 and 17 connected into the four-wire circuit of the respective subscribers A and B. In the example shown, when the subscriber B receives the signal $x(t)$, the echo-canceller 17 is adapted to generate a synthetic echo signal $\hat{y}(t)$ which will be placed in opposition in a subtractor 19 to the real echo signal $y(t)$ appearing on his transmission line with a view to cancelling it out.

The echo-cancellers 16 and 17 are mutually identical.

The echo-canceller 16 functions in an identical manner to the canceller 17, on a signal transmitted by subscriber B, or received by subscriber A, and giving rise to an echo signal in the transmission line of subscriber A (channel 14): the synthetic echo built up by the canceller 16 is brought into opposition in 18 to this real echo so as to cancel it out.

According to the conventional method illustrated in FIG. 2, an echo-canceller of the digital type consists essentially of a transverse filter having a servo-controlled weighting coefficient. The transverse filter enables the samples of a synthetic echo to be built up starting from a finite number, say N, of weighting coefficients $Ci$ representing the samples of the pulse reply of the echo path and starting from the same number of samples $X(nT)$ of the signal $x(t)$. The synthetic echo signal, which is expressed by the equation:

$$\hat{y}(nT) = \sum_{i=1}^{N} Ci \cdot X(iT)$$

is then subtracted from the corresponding samples of the real echo signal $y(nT)$ present in the transmission line at a instant $nT$.

A preferred mode of operating an echo suppresser of the digital type is given in U.S. Patent application Ser. No. 576,423, filed May 12, 1975. by the Applicant Company.

Basically, in accordance with the embodiment shown diagrammatically in FIG. 2, the samples $X(nT)$ of the signal $x(t)$ taken with the sampling period T on the line 14 and processed in an analogue-digital converter 20, are stored in a shift register 21. At each new time interval T, the oldest sample is replaced by a new sample received at the input of the register 21. The samples $X(iT)$ present in the register are taken off in succession during the period T at the N outlets 22 of the register 21.

The N coefficients $Ci$ are stored in a fully recirculating register 23 during the period T. These coefficients $Ci$ are fed in succession together with the samples $X(iT)$ of the same row to a multiplier 24, and the sum of the N successive products $X(iT) \cdot Ci$ achieved in the period T is processed in a summation device 25 in order to define in digital form a sample of the synthetic echo signal $\hat{y}(nT)$. A subtractor 26, receiving the signal $\hat{y}(nT)$ and the real echo signal $y(nT)$ taken on the line 15 and processed by an analogue-digital converter 27, provides the sample of the residual echo signal $E(nT)$ in place of the echo $y(nT)$ to the line 15.

In order to attenuate this residual echo signal $E(nT)$, as much as possible, an adjustable control loop in the echo canceller adjusts the coefficients $Ci$. This adjustable control loop comprises a correlator 29 which receives the successive samples $X(iT)$ applied to the multiplier 24 and the sample of the residual echo signal $\epsilon(nT)$, in order to derive a correction factor $\Delta Ci$ to be applied to each coefficient $Ci$ of the register 23. These correction factors $\Delta Ci$ are passed to a summation device 30, mounted in the recycling loop of the coefficients $Ci$ of the register 23, at the same time as the respective coefficients coming from the register 23. The summation device 30 corrects the coefficients $Ci$ and passes them on in the corrected state both to the input of the register 23 and to the previously mentioned multiplier 24.

In the adjustable control loop the correlation between $\epsilon(nT)$ and $X(iT)$ enables the coefficients $Ci$ to be adjusted so that the latter reproduce as accurately as possible the samples of the pulse response of the echo path and so that the residual echo signal should be as weak as possible at the end of a period $Tcv$, which is termed the convergence time of the echo canceller. This convergence time $Tcv$ is thus the time required for the echo canceller to synthesise correctly the echo signal. Obviously the performance of an echo canceller will be the better the shorter its convergence time.

When the four-wire circuit extends over a considerable distance compared with the speed of propagation of the telephonic signal over the lines, the signal $x(t)$, appearing on the receiving channel at the point of connection of the echo canceller, will generate on the transmission channel an echo signal appearing at the point of connection of the echo canceller and said transmission line with a delay $To$.

Consequently, when said delay is greater than the time value of the delay line of the transverse filter, there can be no correlation between the samples $X(nT)$ of the received signal and the samples $Y(nT)$ of the delayed echo signal, and accordingly the coefficients $Ci$ of the register 23 will all remain at zero (or will be below a definite threshold value). If this state persists at the end of the convergence time $Tcv$, it is said that the transverse filter is not centred over pulse response of the echo path.

It is accordingly necessary in order to synthesise correctly the pulse-response of the echo path, to provide a transverse filter which embraces not only the period of activity TA of the pulse response of the echo path, but also the maximun delay on the appearance of the echo signal generated from the signal $x(t)$. Another solution may be envisaged; it consists in applying a suitable delay to the samples $X(nT)$ fed to the echo canceller whose transverse filter is provided so as to embrace the period of activity TA of the pulse-response of the echo path. A delay line may be inserted ahead of the filter so as to receive the samples of signal $x(t)$. The number of delay increments associated with this line which it is necessary to introduce at the filter input are then found in determining the delay on the appearance of the echo which is to be compensated for.

The precise object of the invention is to determine accurately the delay to be applied to the samples $X(nT)$ arriving at the transverse filter in order to be able to synthesise the entire duration of the activity of this pulse-response, while operating directly on the received signal $x(t)$.

The subject of the present invention is a centring device for an adjustable transverse filter of an echo canceller of given convergence time $Tcv$, producing a synthetic echo signal by convolution of N samples $X(nT)$ of the received signal $x(t)$ sampled over a period T, stored in a first register, and of N weighting filter coefficients C obtained by correlation of the residual echo signal and of the samples $X(nT)$ of the received signal $x(t)$ and stored in a second register having a recycling period T, the centring device including a delay circuit, with multiple outlet connections, positioned ahead of said transverse filter in order to delay the samples of the received signal $x(t)$ to be applied to said first register, and a control device for connecting one of the outlets of the delay circuit to the input of said first register, the selection of the outlet being made by detection when a fixed threshold value is exceeded by weighting coefficients, said value being given by a comparator receiving the filter weighting coefficients during the connection of the successive outlets of the delay circuit to the input of said first register, characterised in that said delay circuit consists of a plurality of delay element in series, each having a delay equal to $TN/n$, $N/n$ being a whole number, and that said control circuit given operates in successive cycles of duration $Tcv + Tr$, $Tr$ being a search time equal at least to a period T and starting at the end of the convergence time $Tcv$, said control circuit comprising a detector circuit during said search time $Tr$ of each cycle $Tcv + Tr$, of the minimal rank of the filter weighting coefficients C detected as lying above said threshold value, said circuit being controlled by an $n$-divisor, which defines $n$ intervals $T/n$ in each period T, for connection from among the $n$ successive delay elements, to the input of said first register, the said $n$ delay elements in series, when the threshold is not exceeded by one of the filter weighting coefficients C, or the number of delay elements deduced from said minimal detected rank of coefficient C lying above said threshold value, when the latter is exceeded by said coefficient C.

Thus, according to the invention, in the course of a cycle $Tcv + Tr$ in respect of which all the coefficients $Ci$ are below the threshold value, a whole delay line of $n$ elements will be switched over in the register of samples $X(nT)$; on the contrary, in the course of a cycle $Tcv + Tr$ in respect of which the minimun rank of the $Ci$ coefficients above the threshold value is detected, only a corresponding part of said delay line of $n$ elements is inserted on the register input.

Other characteristic features and the advantages of the present invention will be apparent in the course of the description of an embodiment illustrated in the attached drawings in which.

Figure 3:
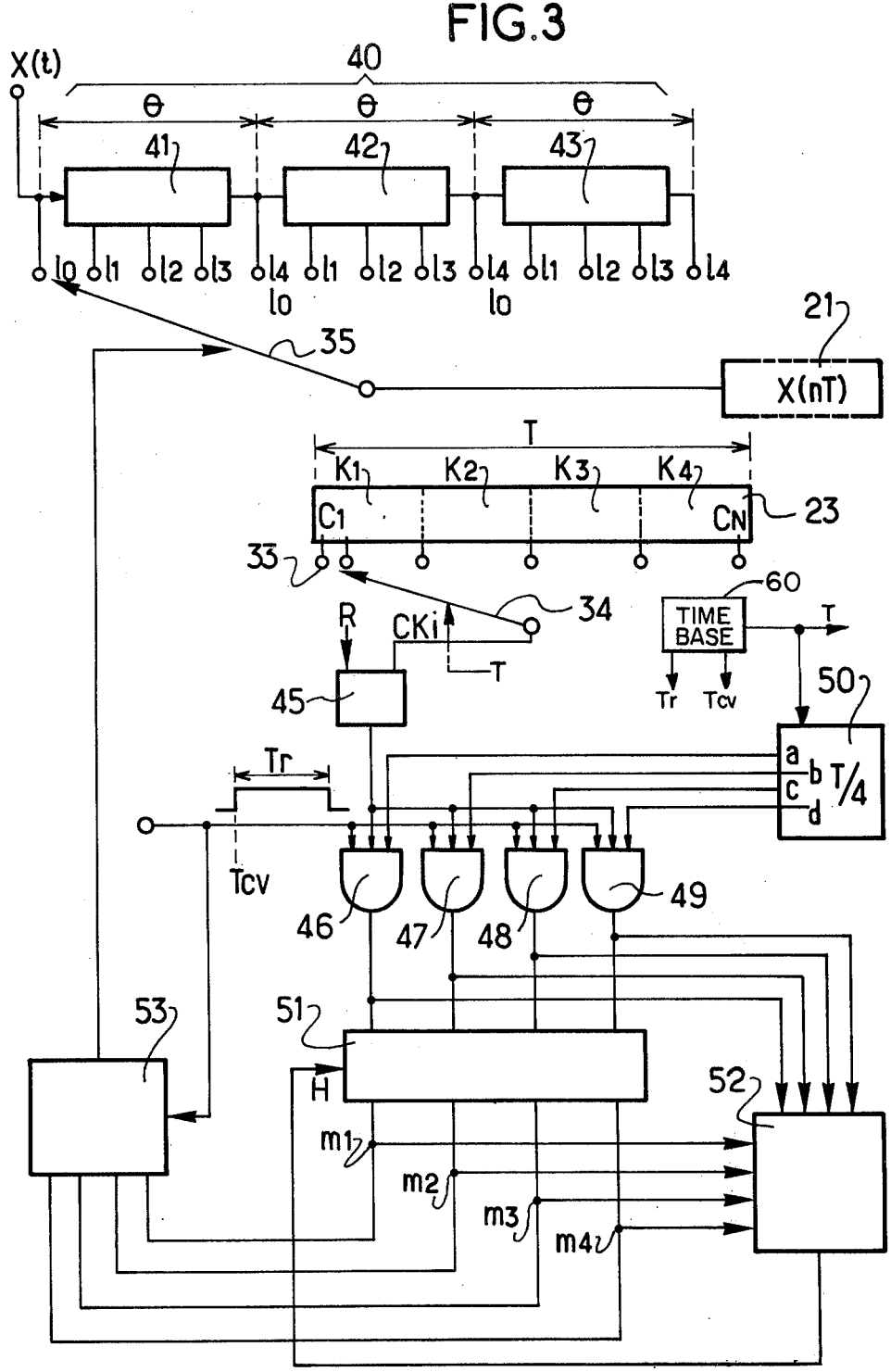
FIG. 3 shows the centring device for a transverse filter of an echo canceller, according to the present invention.
Figure 4:
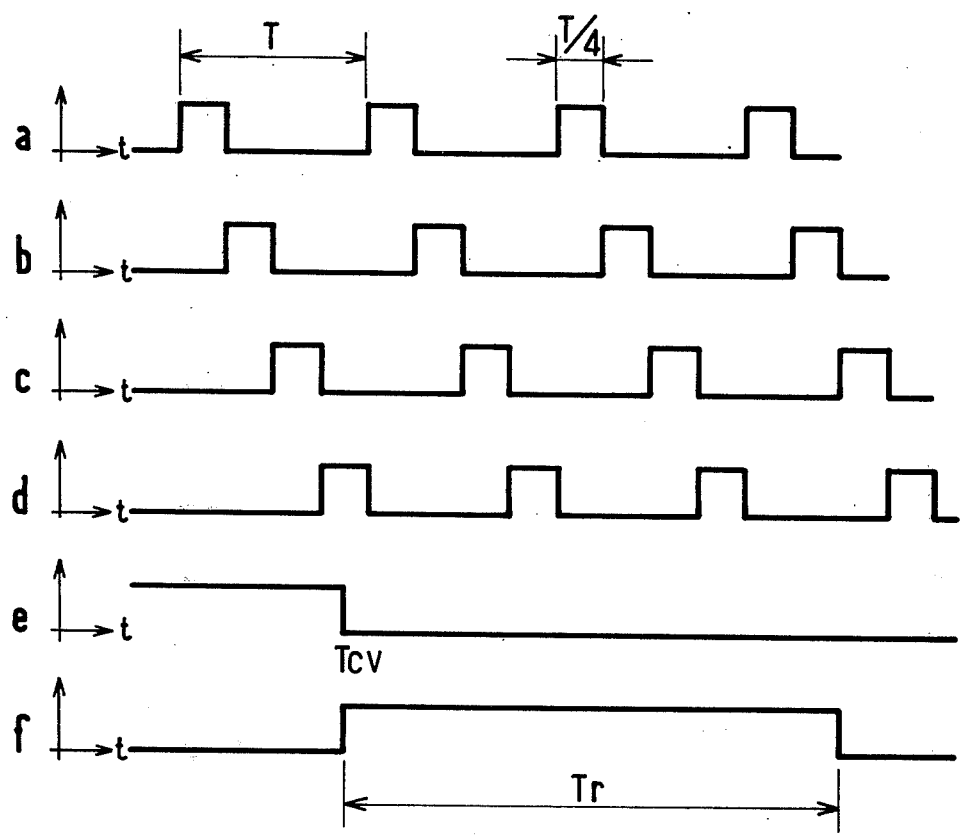

FIG. 4 gives diagrams of signals obtained in the apparatus of FIG. 3.

Figure 2:
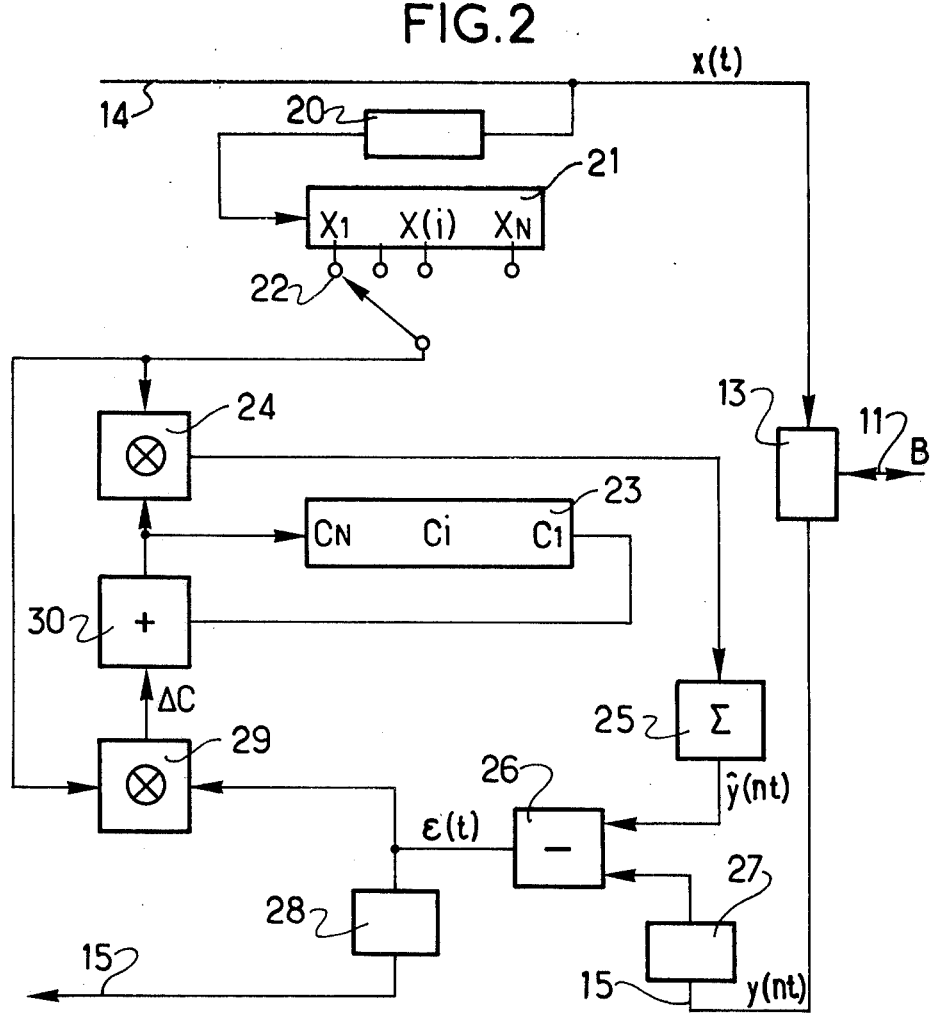

In FIG. 3, the echo canceller whose general layout is given in FIG. 2, is merely represented on the one hand by the register for storing the N samples $X(nT)$ taken successively at period T, and on the other hand, by the register 23 for storage of the N weighting coefficients $Ci$ recycling during the period T. The recycling loop 23 is properly drawn in FIG. 2 with its input connected to the output of adder 30 for adjusting the N coefficients $Ci$ during the period T. However, since the present invention is not concerned with adjusting the coefficients $Ci$ the adder 30 and associated circuits have been omitted in FIG. 3. Further, since the present invention is actually concerned with the phase position of the storing of N coefficients $Ci$ in the register 23, this register has been represented as an addressable register having N outlets 33 successively connected to a rotary switch 34. The switch 34 passes through all N outlets 33 during each period T, shifting from one to the next after a time interval of T/N. By means of this illustrative device a disposition which is actually situated in time is converted to an equivalent disposition in space which is therefore inherently easier to visualize.

The device according to the invention ensuring the centring of the transverse filter of the echo canceller on the pulse-response of the echo path functions by the application of a variable delay to the successive samples $X(nT)$ stored in the register 21. The samples $X(nT)$ are fed to the input of an assembly of shift registers indicated at 40 and having a plurality of outlets designated by the letter 1 associated with an index defining their rank, and adapted to be connected by a switch 35 to the input to the register 21.

The assembly of shift registers 40 is made up in this case of three delay lines in series, 41, 42 and 43 respectively. Each one of the delay lines 41 to 43 is adapted to impose a delay on the appearance of the echo equal to the duration $\theta$ of the pulse-response which can be synthesised by the transverse filter. If the number of samples $X(nT)$ stored in 21 and of coefficients $Ci$ stored in 23 is N, N being 64 for example, and if the convolution of the samples $X(nT)$ and of the coefficients is effected in the period T, T being 125 $\mu s$, the duration $\theta$ of the pulse-response synthesised by the transverse filter is $\theta = T.N$, $\theta$ being 8ms.

The three delay lines 41 to 43 are each rated at 8ms; they are adapted to impose a total delay on the appearance of the echo signal of 24ms.

Each of the delay lines 41 to 43 is divided into four delay elements having corresponding outlets, each being labelled according to its rank as $l_0$, $l_1$, $l_2$, $l_3$, and $l_4$, and to each of which the switch 35 can be connected. Delay elements having values of 8, 8/4, 8/2, 3 8/4 and 8 ms correspond to the respective outlets, these values being given by the line to which the outlets belong. From the fact that the three delay lines are arranged in series, it will be noted that the delay imposed on a sample $X(nT)$ by the outlet $l_4$ of one line is equal to the delay imposed by the outlet $l_0$ of the following delay line.

The coefficients $Ci$ issuing in succession from the register 23 at the outlets 33 are applied by the switch 34 to a comparator 45 which also receives a predetermined reference threshold signal R. The exceeding of this threshold value R by the coefficients $Ci$ stored in the register 23 is indicative of the centring of the transverse filter on the pulse-response of the echo path; this excess value causes a signal having a binary value of 1 to appear at the outlet of the comparator 45. If all the coefficients $Ci$ stored in the register 23 lie below this threshold value, the output of the comparator remains at the binary value 0, and the transverse filter is not centred on the pulse-response of the echo path.

The output of the comparator 45 is applied to a plurality of AND gates, in the present case four in number, 46, 47, 48 and 49. These AND gates 46 to 49 are open at the end of the convergence time $Tcv$ in succession by a divisor 50, which divides by four the recycling period T of the coefficients. One of the AND gates 46 to 49, but one only, is thus conductive at the end of the period $Tcv$ to the signal from the comparator 45 which then receives the coefficient designated as $CKi$ from the register 23.

The AND gates 46 to 49 receive respectively the signals issued by the four-divisor 50, and are kept conducting in succession at the end of the convergence time $Tcv$, during a given control period, termed search period and designated as $Tr$. This search period $Tr$ will in practice be relatively short compared with the convergence time $Tcv$, but must necessarily be at least equal to the recycling period T of the coefficients $Ci$ as will be explained in detail hereinafter.

A store 51, previously initialled, connected to the outputs of the four AND gates 46 to 49 ensures the transcription of the state of the outputs of these gates at the time $Tcv$. A comparator 52 likewise receives the outputs of the these AND gates 46 to 49 and it also receives the four-bit signal present in the store 51. It effects the comparison between these two signals in order to control the level applied to the clock input H of the store 51. Initially this input H is at level 1 in order that the stores 51 can record the state of the outputs of the AND gates 46 to 49 at the end of the time $Tcv$. Subsequently the input H assumes the level 1 when the signal from the AND gates 46–49 corresponds to the detection of the exceeding of the threshold of comparison R by a coefficient $Ci$ in the block of rank $Ki$, of the register 23, lower than that previously registered in the store 51. In this case the new state of the outputs of the AND gates 46 to 49 is substituted for the previous state in the store 51. The mode of functioning of this comparator 52 ensuring the control of the clock input H of the store 51 will be explained in further detail hereinafter.

The four outputs of the store 51, labelled $m1$ to $m4$, connected to the comparator are also connected to a decoder 53 ensuring control of the positioning of the switch 35 on any one of the outlets $l_0$ to $l_4$ of a delay line 41 to 43 as a function of the state of the store 51 at the end of the time $Tr$. In this device the times $Tcv$ and $Tr$ as determined above are processed commencing with a pilot clock pulse (not shown), starting from which there likewise commences the recycling of the coefficients C in the register 23.

The mode of functioning of the centring circuit of FIG. 3 is described in the following, especially with reference to FIG. 4 which gives the signal diagrams. The four signals designated $a$, $b$, $c$, $d$ issuing from the divisor 50, dividing up the recycling period T of the coefficients $Ci$ in the register 23 are shown in the diagrams $a$, $b$, $c$, $d$ of FIG. 4. In the diagram $e$, there is shown the ascertained convergence time $Tcv$ of the echo canceller; in the diagram $f$ there is shown the search time $Tr$ which follows the end of the convergence time $Tcv$ with a pulse the duration of which is longer than the period T.

The application to the AND gates 46 to 49 of the signals $a$, $b$, $c$, $d$ from the divisor 50 with the output signal from the comparator, at the moment of ending of $Tcv$, results in dividing up the register 23 into four elements or blocks. This is shown in FIG. 3 by the dotted lines dividing the register 23 into four blocks K1, K2, K3 and K4.

The four signals appearing at the outputs of the gates 46 to 49 enable it to be ascertained, at the end of $Tcv$, whether the coefficient $CKi$ thereupon applied to the comparator 45 has reached the significant value ($CKi>R$). If this is the case, they enable the rank 1 to 4 of the block o the register to which this coefficient $CKi$ belongs to be recognised. The rank of the block 23 containing $CKi$ is stored in 51 (H=1) by recording the state of the outlets of the AND gates 46 to 49. This rank is likewise received by the comparator 52.

The time $Tr$ provided at the end of the convergence time $Tcv$ enables the values of all the coefficients $Ci$ in the register 23 to be examined and especially the coefficients of rank lower than $CKi$. To this end the search time $Tr$ is chosen so as to be at least equal to T in order to enable the N coefficients C of the register 23 to be recycled at least once.

The AND gates 46 to 49 are opened in succession by the outlets a to d of the divisor 50 during this period $Tr$. During said period, the successive states undergone by the outlets of the AND gates 46 to 49, representing the four blocks of the register 23 are applied to the comparator 52. This comparator 52 likewise receives the contents of the store 51 and provides at its outlet a signal at the level 1 when the rank of the fresh block detected by the state of the AND gates is lower than the rank represented by the contents of the store 51. If the clock input H is at the level 1, the state of the outlets of the AND gates 46 to 49 is substituted for the contents of the store 51.

At the end of the search period $Tr$ the decoder 53 receives the contents of the store 51 in order consequently to control the positioning of the switch 35 on the appropriate outlet $l_0$ to $l_4$ of the first register 41. This control enables the insertion, ahead of the register storing the samples X(nT), the number of delay elements of the first delay line 41 required in order to result in centring or substantial centring, of the transverse filter. The rank of the block of the register 23 stored in 51 at the end of the period Tr, reduced by one unit, gives the rank of the outlet 1 to which the switch 35 is connected. The following table summarises the mode of functioning of the device according to the invention, as a function of the block of the lowest rank containing a coefficient CKi larger than the threshold value R.

| m1 | m2 | m3 | m4 | $l_0$ | $l_1$ | $l_2$ | $l_3$ | $l_4$ |
|----|----|----|----|----|----|----|----|----|
| 1 | 0 | 0 | 0 | 1 | 0 | 0 | 0 | 0 |
| 0 | 1 | 0 | 0 | 1 | 1 | 0 | 0 | 0 |
| 0 | 0 | 1 | 0 | 1 | 1 | 1 | 0 | 0 |
| 0 | 0 | 0 | 1 | 1 | 1 | 1 | 1 | 0 |
| 0 | 0 | 0 | 0 | 1 | 1 | 1 | 1 | 1 |

In this table the outlet *mi* of the store 51 given the value 1 indicates that the block of the same rank, of the register 23, contains a coefficient CKi greater than the threshold value R, a connection $l_1$ given the value 1 indicates that the block of the corresponding delay element is inserted ahead of the register 21 containing the samples X(nT).

If however at the end of the period Tcv + Tr all the coefficients Ci are below the threshold value R, the first delay line 41 is switched bodily into the register 21, A fresh calculating cycle is then performed by the application of a fresh convergence time Tcv followed by a fresh search time Tr. If at the end of the second cycle Tcv + Tr the coefficients C are all zero, the second delay line 42 is likewise bodily switched over, together with the first line 41, ahead of the register 21. A third calculating cycle for the period Tcv + Tr is thereupon performed.

At the end of a calculating cycle, as soon as the minimal rank of the block Ki of the register containing significant coefficients C has been received, the delay line corresponding to this calculating cycle is partially switched over, in series with the delay lines ahead, to the register 21. The transverse filter is then considered to be centred, i.e. it completely covers the pulse-response of the echo path.

Let us assume a transverse filter capable of synthesising 8 ms of pulsed response (T=125 $\mu$s, N = 64), together with three delay lines 41 to 43 each with a delay of 8 ms.

If the duration of activity of the pulse-response is equal at the maximum to 5 ms, the maximum delay on the appearance of the echo applied to the samples X(nT) which can be compensated for by the device shown in FIG. 3, with three lines of adjustables delay, is: 8 ms × 3 + 8 ms − 5 ms, say, 27 ms.

Figure 1:
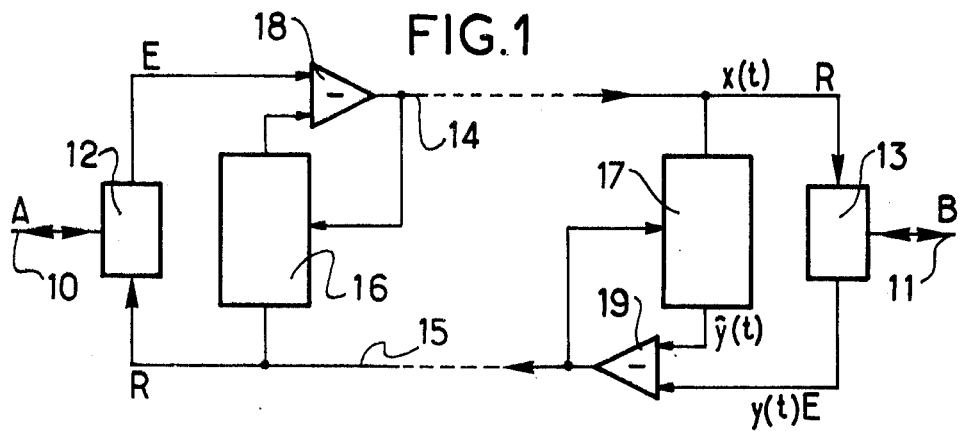
FIGS. 1 and 2 depict a telephone network and an echo canceller of known design.

It will also be noted that when a signal z(t) transmitted by the home subscriber B (FIGS. 1 and 2) is found to be present on the line 15, the search for the delay to be applied to the samples X(nT) is discontinued, since the coefficients Ci can only assume a significant value when the received signal x(t) and the echo signal generated therefrom are the only ones present on the four-wire circuit.

The present invention has been described with reference to an embodiment given by way of example and it is obvious that modifications in detail and/or replacements of certain features by others technically equivalent thereto may be without departing from the scope of this invention. For example, the divisor 50 may divide the period T into many number n other than four, always provided that N/n is a whole number.

We claim:

1. In a long distance telephone network, for use at a point where an echo path gives rise to an echo signal y(t), in response to an inward signal x(t) an echo canceller for developing a synthetic echo signal $\hat{y}(t)$; the echo canceller comprising an adjustable transverse filter of determinate convergence time Tcv, and including:

a first register for storing N successive samples X1 through XN of the signal x(t) samples at a sample interval T;

a second register for storing N successive filtration weighting coefficients C1 through CN simulating N samples of the pulse response characteristic of the echo path;

means for producing one sample of the synthetic echo signal $\hat{y}(t)$ during each sampling period T by convolution of the N samples X1 through XN with the N coefficients C1 through CN;

means for producing a residual echo signal $\epsilon(t)$ from the echo signal $\hat{y}(t)$ and the synthetic echo signal y(t), and servo-control means for adjusting the N coefficients in response to the residual echo signal $\epsilon(t)$;

the improvement comprising:

a variable delay circuit connected between an input for the inward signal x(t) and an input to said first register, said variable delay circuit comprising a series connection of a plurality of delay elements each having a predetermined delay of T.N/n, where N/n is a whole number, each of said delay elements having an output switchable to said input to said first register means for accepting in succession the N coefficients C1 through CN during each sampling period T and for detecting any of said coefficients which is higher in value than a given threshold value R, means for detecting the rank of said detected coefficients of value greater than R, for detecting the minimum such rank and for storing the minimum rank detected, where the N coefficients are considered as being sub-divided into n successive ranks with N/n coefficients in each rank;

switching means responsive to the stored minimum rank and connected to said variable delay circuit and said first register to increase the delay applied to the inward signal x(t) before its application to the first register by a number of delay elements which is one less than the minimum rank, and by n delay elements when no coefficient C has been detected of value greater than R; and time base means arranged to provide pulses subdividing each sampling period T into n ranking periods each lasting T/n for use in determining the minimum rank and to provide a control pulse waveform having a minimum-rank search-period of duration Tr which is at least as great as T with a non-search period of duration which is at least as great as the convergence period Tcv, such that a minimum rank is sought in cycles, each cycle having a duration of at least $Tcv + Tr$, thereby allowing the coefficients to converge in a new order after each variation of the variable delay circuit.

2. A device according to claim 1 wherein said means for detection of the ranks of the coefficients detected comprises a logic circuit combining the $n$ successive pulses of duration $T/n$ in each period $T$ and signals successively supplied by the said means for detection of coefficients in order to supply in succession $n$-bit information representative of the ranks of coefficients detected, said means for storing comprising a storage unit receiving such $n$-bit information delivered by the said logic circuit and of which the content is renewed in the presence of the search pulse $T_r$ through the incoming information representative of one rank lower than that previously recorded.

3. A device according to claim 2 wherein said means for storing includes a comparator receiving on the one hand said successive $n$-bit information and on the other hand the information present in storage for delivering a control pulse to said storage unit for substitution of the information stored through the infed $n$-bit information, when this last infed information is representative of a rank lower than that represented by the stored information.

* * * * *